United States Patent
Ooe

(10) Patent No.: US 10,766,750 B2
(45) Date of Patent: Sep. 8, 2020

(54) VERTICALLY MOVABLE WORKPIECE SUPPORT DEVICE

(71) Applicant: Daifuku Co., Ltd., Osaka (JP)

(72) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 140 days.

(21) Appl. No.: 16/057,311

(22) Filed: Aug. 7, 2018

(65) Prior Publication Data
US 2019/0039866 A1    Feb. 7, 2019

(30) Foreign Application Priority Data
Aug. 7, 2017    (JP) ................................. 2017-152187

(51) Int. Cl.
| | | |
|---|---|---|
| *B66F 3/06* | (2006.01) | |
| *B66F 17/00* | (2006.01) | |
| *B66F 3/22* | (2006.01) | |
| *B66F 7/06* | (2006.01) | |
| *B62D 65/18* | (2006.01) | |

(52) U.S. Cl.
CPC ................. *B66F 3/06* (2013.01); *B66F 3/22* (2013.01); *B66F 7/0625* (2013.01); *B66F 7/0666* (2013.01); *B66F 17/00* (2013.01); *B62D 65/18* (2013.01)

(58) Field of Classification Search
CPC ...... B66F 3/00; B66F 3/02; B66F 3/06; B66F 3/12; B66F 3/16; B66F 3/18; B66F 3/22; B66F 7/0625; B66F 7/0666; B66F 17/00; B66F 5/00; B62D 65/18

USPC .................. 254/95, 122, 123, 124, 125, 126
See application file for complete search history.

(56) References Cited

U.S. PATENT DOCUMENTS

| | | | |
|---|---|---|---|
| 2008/0315168 A1* | 12/2008 | Takeuchi | B66F 7/0666 254/358 |
| 2010/0140572 A1* | 6/2010 | Aoki | F16G 13/20 254/1 |

FOREIGN PATENT DOCUMENTS

JP            H0719694 A        1/1995

* cited by examiner

*Primary Examiner* — Monica S Carter
*Assistant Examiner* — Alberto Saenz
(74) *Attorney, Agent, or Firm* — St. Onge Steward Johnston & Reens LLC

(57) ABSTRACT

A vertically movable workpiece support device has a drive chain bendable to only one side which supports a workpiece support base in a vertically linear path section. The drive chain extends from one end portion coupled to the workpiece support base to an intermediate portion engaging with a driving sprocket wheel. A chain guide plate which sandwiches, with the driving sprocket wheel, a link-to-link roller of the drive chain is arranged on an outer side of the driving sprocket wheel. A mark is displayed, on the side surface of the chain guide plate, in a position separated a certain distance outward from a turning path of links in the drive chain, and an opening portion for visually checking the mark is provided in a side wall which pivotally supports the driving sprocket wheel.

3 Claims, 9 Drawing Sheets

VERTICALLY MOVABLE WORKPIECE SUPPORT DEVICE

FIELD OF THE INVENTION

The present invention relates to a vertically movable workpiece support device which includes a parallel link mechanism that supports a workpiece support base so as to be parallelly and vertically movable and a raising/lowering drive means that drives the workpiece support base to raise and lower the workpiece support base.

BACKGROUND OF THE INVENTION

In some vertically movable workpiece support devices, the drive chain is configured so as to support the workpiece support base in a vertically linear path section extending from one end portion coupled to the workpiece support base to an intermediate portion engaging with the driving sprocket wheel, and this type of vertically movable workpiece support device has been utilized by installing the device on a conveying traveling body, for example, in order to change the height of a workpiece which is placed on the workpiece support base to be conveyed, in a predetermined section on a conveying path. In the vertically movable workpiece support device described above, as described in Japanese Published Unexamined Patent Application No. H07-017694 (Patent Literature 1), the drive chain engages with the driving sprocket wheel in a range of approximately 90 degrees between a position directly below the driving sprocket wheel and the lower end of the vertically linear path section. However, in order to prevent a failure in which the drive chain engaging with the driving sprocket wheel is disengaged from the driving sprocket wheel by part of thrust received from the driving sprocket wheel so as to be displaced outward and in which the engagement depth of the drive chain with respect to the driving sprocket wheel becomes shallow, a chain guide plate is additionally provided which is fitted between links on both left and right sides forming the drive chain so as to make contact with a link-to-link roller.

SUMMARY OF THE INVENTION

In the vertically movable workpiece support device configured as described above, when the drive chain engaging with the surrounding of the driving sprocket wheel in a range of approximately 90 degrees receives upward or downward thrust by the driving sprocket wheel which is rotationally driven, since the drive chain simultaneously receives an outward component force that disengages the drive chain from the driving sprocket wheel, the outer circumferential surface of the link-to-link roller forming the drive chain is strongly pressed against a roller guide surface of the chain guide plate, and the inner circumferential surface of the link-to-link roller also makes contact with the between-teeth recessed surface of the driving sprocket wheel and receives resistance. Consequently, the roller guide surface of the chain guide plate wears, partially because it is disadvantageous in terms of material. When the wear of the roller guide surface of the chain guide plate progresses, the drive chain which is turned around the driving sprocket wheel is made to pulsate in an inward/outward direction, and this causes not only the generation of abnormal noise but also various failures. Therefore, it is necessary to perform a maintenance operation such as the replacement of the chain guide plate at an appropriate time, however, measures for easily and accurately recognizing the time at which the chain guide plate needs to be replaced, that is, the time at which the amount of wear of the roller guide surface in the chain guide plate exceeds a set value have not been considered.

The present invention proposes a vertically movable workpiece support device which can solve the conventional problem described above, and for ease of understanding of a relationship with an embodiment which will be described later, the vertically movable workpiece support device according to the present invention will be shown with reference signs which are used in the description of the embodiment and which are placed in parentheses. In the vertically movable workpiece support device which includes a parallel link mechanism (11) that supports a workpiece support base (10) so as to be parallelly and vertically movable and a raising/lowering drive means (29) that drives the workpiece support base (10) to raise and lower the workpiece support base (10) and in which the raising/lowering drive means (29) is formed with a drive chain (30a) that is bendable to only one side and a driving sprocket wheel (31a) that engages with the drive chain (30a) and in which the drive chain (30a) supports the workpiece support base (10) in a vertically linear path section (36) that is extended from one end portion coupled to the workpiece support base (10) to an intermediate portion engaging with the driving sprocket wheel (31a), a chain guide plate (47) which sandwiches, with the driving sprocket wheel (31a), a link-to-link roller (44) of the drive chain (30a) that is turned around the driving sprocket wheel (31a) is arranged on an outer side of the driving sprocket wheel (31a), a mark (60) is displayed, on a side surface of the chain guide plate (47), in a position separated a certain distance outward from a turning path of links (42, 43) in the drive chain (30a), and an opening portion (61) for visually checking the mark (60) is provided in a side wall (52a) that is positioned lateral to the chain guide plate (47) on which the mark (60) is displayed and that pivotally supports the driving sprocket wheel (31a).

According to the configuration of the present invention described above, at the time of assembly of a new chain guide plate, that is, under conditions in which the roller guide surface of the chain guide plate which makes contact with the link-to-link roller in the drive chain that is turned around the driving sprocket wheel substantially does not wear, when the mark of the chain guide plate is visually checked from the outside through the opening portion, the space of a certain width is recognized between the turning path of the links in the drive chain seen through the opening portion and the mark. Then, due to the reason described previously, as the wear of the roller guide surface of the chain guide plate progresses, the space between the turning path of the links in the drive chain and the mark is narrowed. Therefore, if the mark is set in advance at such a position that, when the amount of wear of the roller guide surface of the chain guide plate, that is, the amount of outward expansion of the drive chain turned around the driving sprocket wheel reaches an allowable limit, the turning path of the links in the drive chain is seen to make contact with the mark, by only performing an inspection operation to visually observe the space between the turning path of the links in the drive chain and the mark through the opening portion at appropriate time intervals, it is possible to simply and easily check whether or not the degree of the wear of the roller guide surface of the chain guide plate with which the link-to-link roller in the drive chain makes contact reaches the allowable limit.

When, by the check operation described above, it is confirmed that the degree of the wear of the roller guide surface of the chain guide plate reaches the allowable limit, by replacing the chain guide plate with a new one whose roller guide surface does not wear, it is possible to avoid the occurrence of an inconvenient phenomenon in a case where the chain guide plate in a state where the degree of the wear of the roller guide surface reaches the allowable limit is continuously used without being noticed, due to the fact that the lower end portion of the vertically linear path section supporting the workpiece support base of the drive chain is made to pulsate.

Specifically, in a case where the present invention is implemented, preferably, the chain guide plate (47) is provided so as to be extended higher than the height of the axis center of the driving sprocket wheel (31a) to form an outer chain guide plate (50b) of a drive chain holding means (49) formed with a pair of inner and outer chain guide plates (50a, 50b) which sandwich, from both inner and outer sides, the lower end portion of the vertically linear path section (36) of the drive chain (30a), and the mark (60) and the opening portion (61) are provided within a vertical region which includes the height of the axis center of the driving sprocket wheel (31a). Therefore, although a region in which the drive chain turned around the driving sprocket wheel is easily made to pulsate in the inward/outward direction of the driving sprocket wheel due to the wear of the roller guide surface of the chain guide plate is recognized to be present around the height of the axis center of the driving sprocket wheel, according to the configuration described above, it is possible to accurately and visually check the wear of the roller guide surface of the chain guide plate around the height of the axis center of the driving sprocket wheel and thereby reliably achieve the intended object of the present invention. Preferably, in a case where this configuration is adopted, the mark (60) is formed with a straight line in an up/down direction, and the opening portion (61) of the side wall (52a) is formed with a long hole which is long in the up/down direction. According to this configuration, it is possible to easily and visually check a phenomenon caused by the progress of the wear of the roller guide surface of the chain guide plate, that is, the expansion of the turning path of the drive chain which is turned around the driving sprocket wheel.

DETAILED DESCRIPTION OF THE INVENTION

Figure 1:
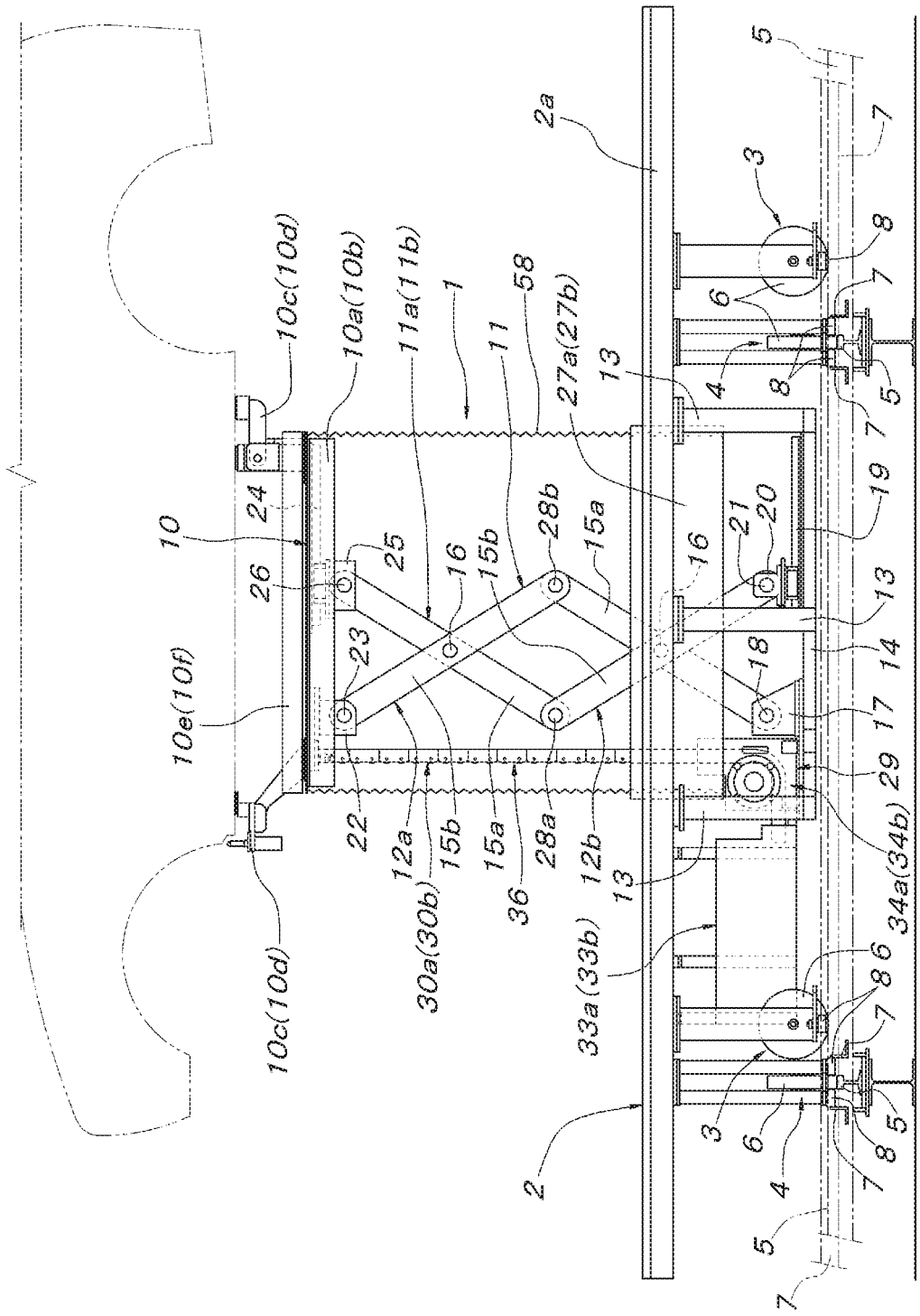
FIG. 1 is side view in a state where a workpiece support base is raised to a raising limit height.
Figure 2:
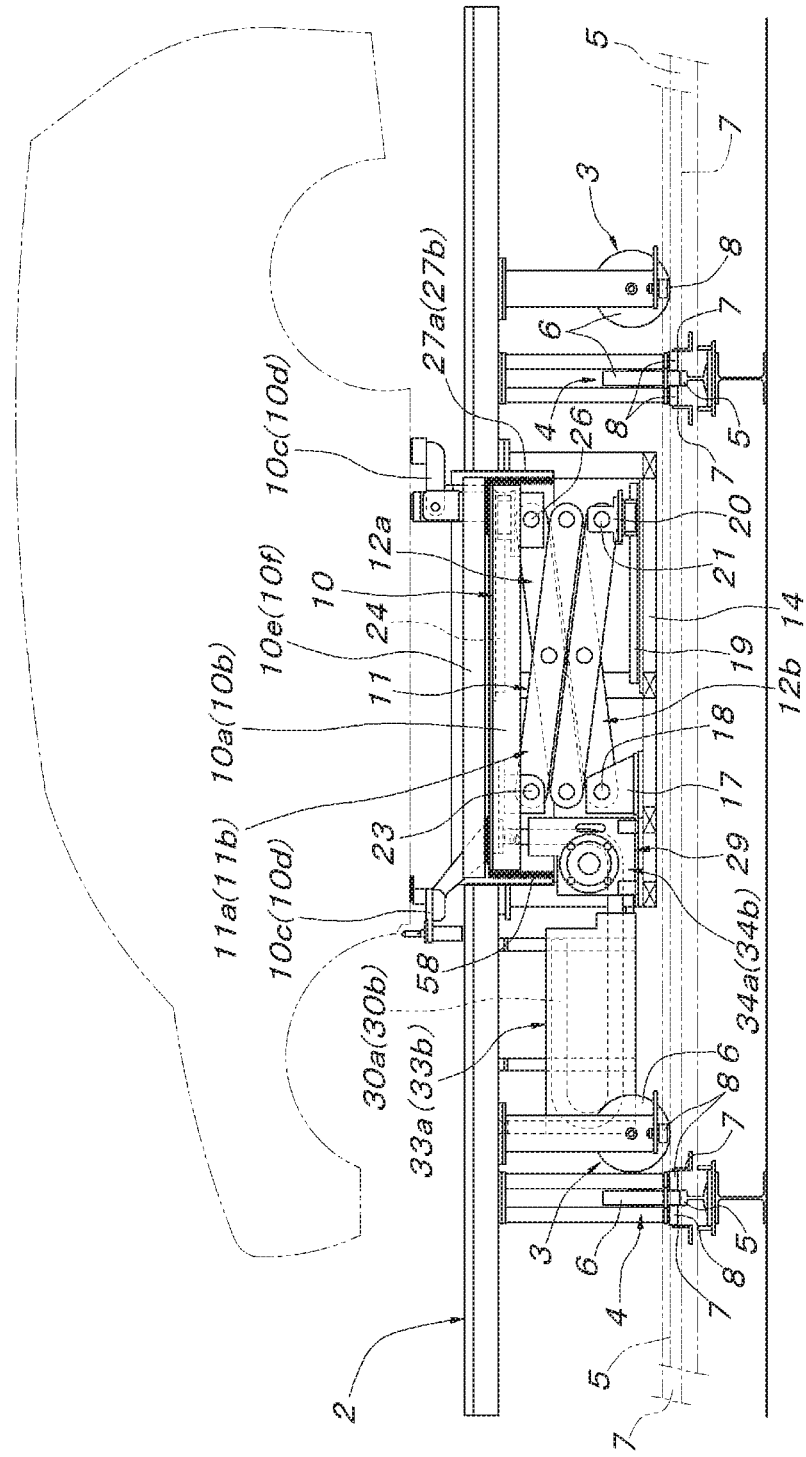
FIG. 2 is side view in a state where the workpiece support base is lowered to a lowering limit height.

An embodiment in which a vertically movable workpiece support device 1 according to the present invention is mounted on a conveying traveling body 2 will be described below with reference to drawings. Although the conveying traveling body 2 may adopt any configuration, as shown in FIGS. 1 and 2, in this embodiment, the conveying traveling body 2 includes four longitudinal traveling wheel units 3 which are used at the time of traveling in a longitudinal traveling path where the conveying traveling body 2 travels in a length direction, and four lateral traveling wheel units 4 which are used at the time of traveling in a lateral traveling path where the conveying traveling body 2 travels in a width direction. All the wheel units 3 and 4 are formed with load supporting wheels 6 which are rolled on a pair of left and right guide rails 5 laid on the longitudinal traveling path and the lateral traveling path, and a pair of left and right steady rollers 8 which are loosely fitted between steady guide plates 7 provided in parallel to both left and right sides of the respective guide rails 5. The four longitudinal traveling wheel units 3 for the longitudinal traveling path are provided at a higher level than the four lateral traveling wheel units 4 for the lateral traveling path. As a traveling drive means for propelling the conveying traveling body 2, various types of known means, although not shown, can be used. For example, a friction drive means is preferable which utilizes friction drive wheels that are pressed against the sides of a main body 2a, which is rectangular in plan view, of the conveying traveling body 2 parallel to each other so as to be rotationally driven.

The workpiece support device 1 is formed with a workpiece support base 10 which is raised and lowered in a substantially center position of the main body 2a in the conveying traveling body 2, a parallel link mechanism 11 which supports the workpiece support base 10 so as to be parallelly and vertically movable, and a raising/lowering drive means 29 which drives the workpiece support base 10 to raise and lower the workpiece support base 10. The workpiece support base 10 is formed with supporting main bodies 10a and 10b (see FIG. 4) which are arranged in parallel to each other with space therebetween and which are formed with a pair of left and right groove-shaped members that are long in a forward/backward direction, workpiece supporting jigs 10c and 10d which are additionally provided on both front and rear end portions of the respective supporting main bodies 10a and 10b, and rectangular box-shaped cover members 10e and 10f which cover the tops of the respective supporting main bodies 10a and 10b. The parallel link mechanism 11 is formed with a pair of left and right parallel link units 11a and 11b which individually support the respective supporting main bodies 10a and 10b of the workpiece support base 10 so as to be parallelly and vertically movable. Both the parallel link units 11a and 11b have the same structure as each other and are formed with two-stage upper and lower crosslinks 12a and 12b which are interlockingly coupled to each other. The respective parallel link units 11a and 11b are installed on a lower horizontal frame 14 which is suspended from the lower side of the main body 2a of the conveying traveling body 2 via a column member 13.

In the respective crosslinks 12a and 12b, two link units 15a and 15b which have the same length and which overlap each other are pivotally supported with horizontal support shafts 16 at a center position so as to freely open and close, the lower end portion of the inner link unit 15a of the lower crosslink 12b is pivotally supported with a horizontal support shaft 18 to a fixed bearing 17 installed on the lower horizontal frame 14 so as to freely rise and fall, and the lower end portion of the outer link unit 15b of the lower crosslink 12b is pivotally supported with a horizontal support shaft 21 so as to freely rise and fall to a movable bearing 20 which is supported on guide rails 19 laid on the lower horizontal frame 14 so as to be movable horizontally forward and backward. The upper end portion of the outer link unit 15b of the upper crosslink 12a is pivotally supported with a horizontal support shaft 23 so as to freely rise and fall to a fixed bearing 22 which is additionally provided on a bottom surface of a concave groove portion in the respective supporting main bodies 10a and 10b on a vertical imaginary line passing through the axis center of the horizontal support shaft 18 fixed at the position as described above in side view, and the upper end portion of the inner link unit 15a of the upper crosslink 12a is pivotally supported with a horizontal support shaft 26 so as to freely rise and fall to a movable bearing 25 which is supported so as to be movable horizontally forward and backward on guide rails 24 laid on the bottom surface of the concave groove portion in the respective supporting main bodies 10a and 10b.

As shown in FIG. 1, as the parallel link units 11a and 11b are extended, the respective supporting main bodies 10a and 10b of the workpiece support base 10 are moved upward in parallel, and it is configured such that, the parallel link units 11a and 11b extended at this time pass through the inside of a pair of left and right rectangular cylindrical bodies 27a and 27b which are attached to penetrate the main body 2a of the conveying traveling body 2 in an up/down direction and which are long in the forward/backward direction. As shown in FIG. 2, it is configured such that, when the parallel link units 11a and 11b are contracted and the respective supporting main bodies 10a and 10b of the workpiece support base 10 are lowered to a lowering limit height, the respective supporting main bodies 10a and 10b enter the respective rectangular cylindrical bodies 27a and 27b attached to the main body 2a of the conveying traveling body 2. In addition, it is configured such that, when the parallel link units 11a and 11b are contracted and the respective supporting main bodies 10a and 10b of the workpiece support base 10 are lowered to the lowering limit height as described above, the inner link units 15a and 15a and the outer link units 15b and 15b in the upper and lower crosslinks 12a and 12b respectively overlap each other vertically. Reference signs 28a and 28b denote horizontal support shafts which respectively and pivotally support and couple the link units 15a and 15a and 15b and 15b in the upper and lower crosslinks 12a and 12b.

The raising/lowering drive means 29 which drives the workpiece support base 10 to raise and lower the workpiece support base 10 is formed with a pair of left and right drive chains 30a and 30b which individually drive both the supporting main bodies 10a and 10b to raise and lower the supporting main bodies 10a and 10b, driving sprocket wheels 31a and 31b which drive the respective drive chains 30a and 30b, a speed reducer equipped motor 32 which synchronously drives both the driving sprocket wheels 31a and 31b, and drive chain free end side storage casings 33a and 33b which store the free end sides of the respective drive chains 30a and 30b.

The drive chains 30a and 30b are formed with roller chains known as push chains which are configured to be bendable from a linear state to only one side, and one end portions thereof are vertically fixed at positions directly before the respective parallel link units 11a and 11b to the bottom surfaces of concave groove portions in the front end portions of the respective supporting main bodies 10a and 10b such that the bendable sides are positioned on the sides (outer sides) opposite to the sides on which the parallel link units 11a and 11b are present. Within driving sprocket wheel storage casings 34a and 34b installed on the lower horizontal frame 14 of the conveying traveling body 2 and in positions directly before the fixed bearing 17 at the lower ends of the respective link units 11a and 11b, the driving sprocket wheels 31a and 31b are fixed to horizontal rotating shafts 35a and 35b supported to both the driving sprocket wheel storage casings 34a and 34b in a mutually concentric manner. The drive chains 30a and 30b suspended from the respective supporting main bodies 10a and 10b enter the driving sprocket wheel storage casings 34a and 34b from opening portions in the upper ends of the respective driving sprocket wheel storage casings 34a and 34b, and after the bendable sides of the drive chains 30a and 30b engage with the respective driving sprocket wheels 31a and 31b in a range of approximately 90 degrees, the drive chains 30a and 30b are horizontally extended forward (the sides opposite to the sides on which the link units 11a and 11b are present) from opening portions in the front ends of the driving sprocket wheel storage casings 34a and 34b. Then, between the driving sprocket wheels 31a and 31b of the drive chains 30a and 30b and the supporting main bodies 10a and 10b, vertically linear portions 36 are formed.

Figure 3:
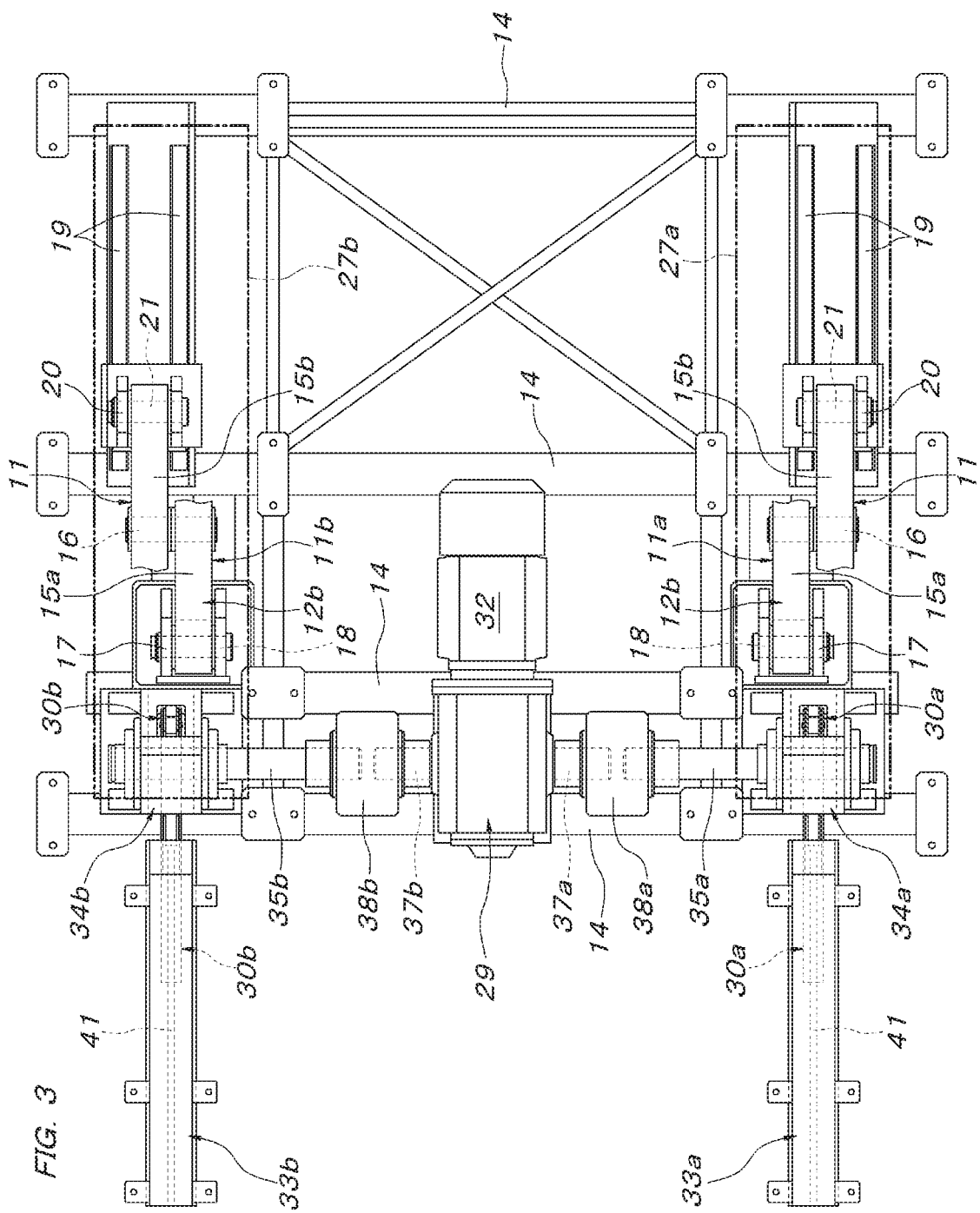
FIG. 3 is a plan view showing an overall mechanism which supports the workpiece support base.
Figure 5:
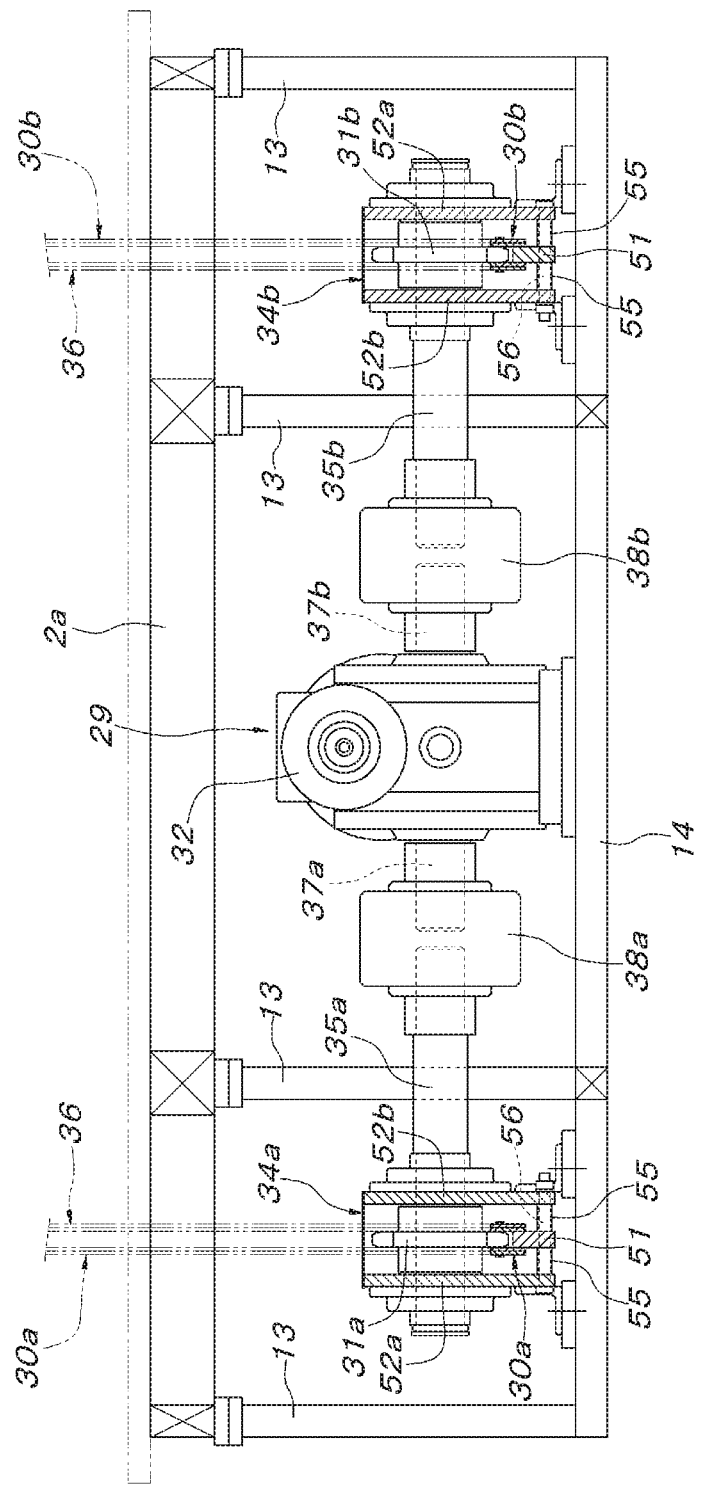
FIG. 5 is a partial vertical cross-sectional rear view showing a main part of a raising/lowering drive means in the workpiece support base.

As shown in FIGS. 3 and 5, the speed reducer equipped motor 32 of the raising/lowering drive means 29 is installed on the lower horizontal frame 14 of the conveying traveling body 2 at a center position between the pair of left and right driving sprocket wheel storage casings 34a and 34b for incorporating and pivotally supporting the driving sprocket wheels 31a and 31b, it is configured such that a pair of left and right output shafts 37a and 37b which concentrically protrude from the speed reducer portion of the speed reducer equipped motor 32 to both the left and right sides and the horizontal rotating shafts 35a and 35b which protrude inward from the pair of left and right driving sprocket wheel storage casings 34a and 34b in a mutually concentric manner are interlockingly coupled to each other via shaft couplings 38a and 38b, and the pair of left and right driving sprocket wheels 31a and 31b are synchronously driven in the same direction at the same speed by the operation of the speed reducer equipped motor 32.

Figure 6:
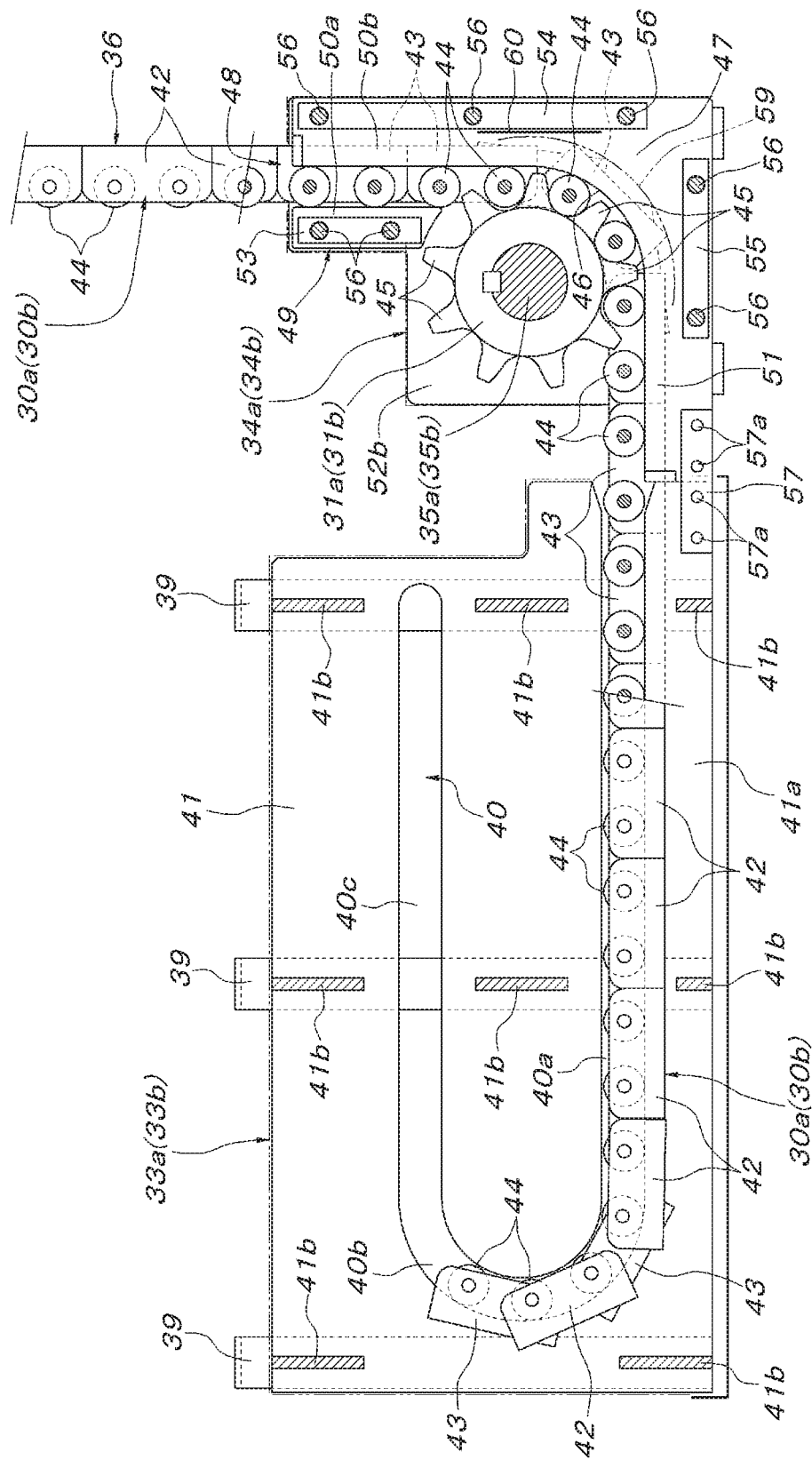
FIG. 6 is a vertical cross-sectional side view showing a drive chain, a driving sprocket wheel and a structure related thereto on one side forming the raising/lowering drive means in the workpiece support base.
Figure 7:
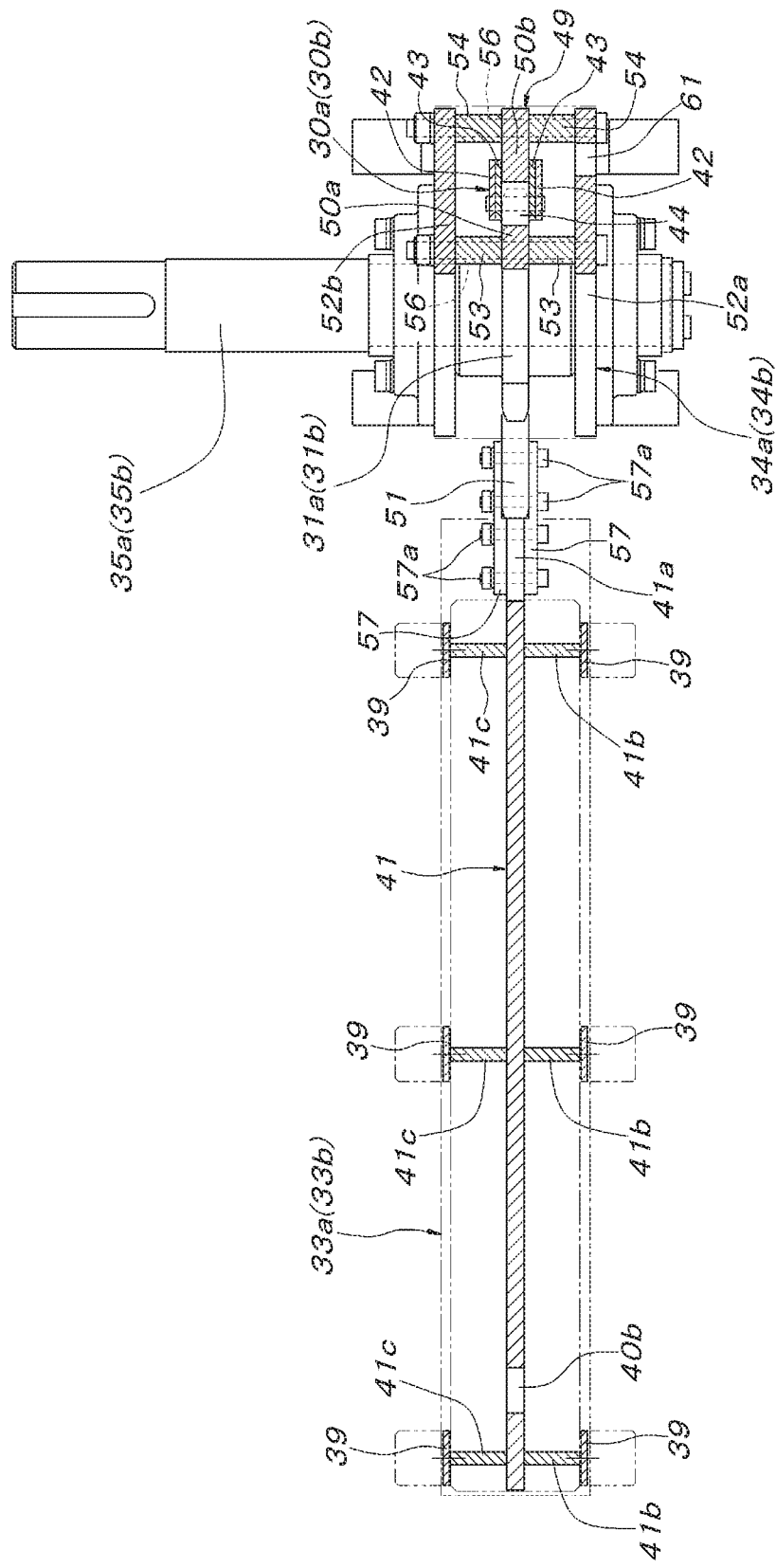
FIG. 7 is a horizontal cross-sectional plan view showing the drive chain, the driving sprocket wheel and the structure related thereto on the same side as in FIG. 6.
Figure 8:
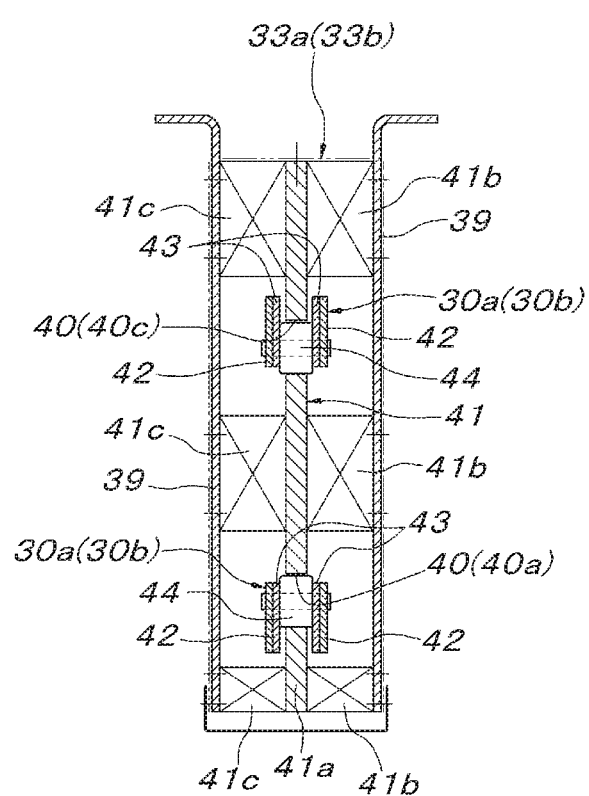
FIG. 8 is a vertical cross-sectional front view showing a free end side storage casing of the drive chain forming the raising/lowering drive means in the workpiece support base.

As shown in FIGS. 6 to 8, in a state where the drive chain free end side storage casings 33a and 33b are positioned in parallel to the forward/backward direction on the front sides (the sides opposite to the sides on which the parallel link units 11a and 11b are present) of the pair of left and right driving sprocket wheel storage casings 34a and 34b for respectively incorporating and pivotally supporting the driving sprocket wheels 31a and 31b, the drive chain free end side storage casings 33a and 33b are suspended via a plurality of pairs of left and right suspending frames 39 in the forward/backward direction from the main body 2a of the conveying traveling body 2. Both the driving sprocket wheel storage casings 34a and 34b have the same structure as each other, and therewithin, vertical guide plates 41 are provided which guide the drive chains 30a and 30b that are extended horizontally forward from the lower sides of the driving sprocket wheels 31a and 31b and which include U-shaped guide slits 40 in a horizontally fallen state. The vertical guide plates 41 are held at fixed positions via coupling plate members 41b and 41c which are interposed between the vertical guide plates 41 and the inner surface of each of the pair of left and right suspending frames 39 positioned on both sides. The U-shaped guide slits 40 are formed with lower horizontal slit portions 40a whose rear ends are opened toward the sides of the driving sprocket wheel storage casings 34a and 34b and upper horizontal slit portions 40c which communicate with the front ends of the lower horizontal slit portions 40a via U-turn slit portions 40b.

As shown in FIG. 6, the drive chains 30a and 30b are formed with a pair of left and right outer links 42 whose end sides in the length direction thereof make contact with each other when they are in a linear state, a pair of left and right inner links 43 which have the same length as the outer links 42 and which are made to overlap with the outer links 42 in a state where the inner links 43 are on the inner side of the outer links 42 and are displaced only by one half of the length of the outer links 42 in the length direction, and link-to-link rollers 44 which are pivotally supported between the pair of left and right inner links with support shafts 44a that penetrate the center positions of the overlapping portions of the outer links 42 and the inner links 43 in the length direction. The diameter of the link-to-link rollers 44 is set such that the link-to-link rollers 44 protrude from the inner sides of the respective links 42 and 43, that is, the inner sides whose both end corner portions in the length direction are chamfered into the shape of arcs but are positioned sufficiently inward with respect to the outer sides of the respective links 42 and 43. Therefore, the drive chains 30a and 30b of this structure are bendable about the support shafts 44a to the side of the inner side on which the link-to-link rollers 44 protrude, however, since both the end sides of the respective links 42 and 43 in the length direction make contact with each other, the drive chains 30a and 30b cannot be bent to the opposite side beyond the linear state.

Figure 9A:
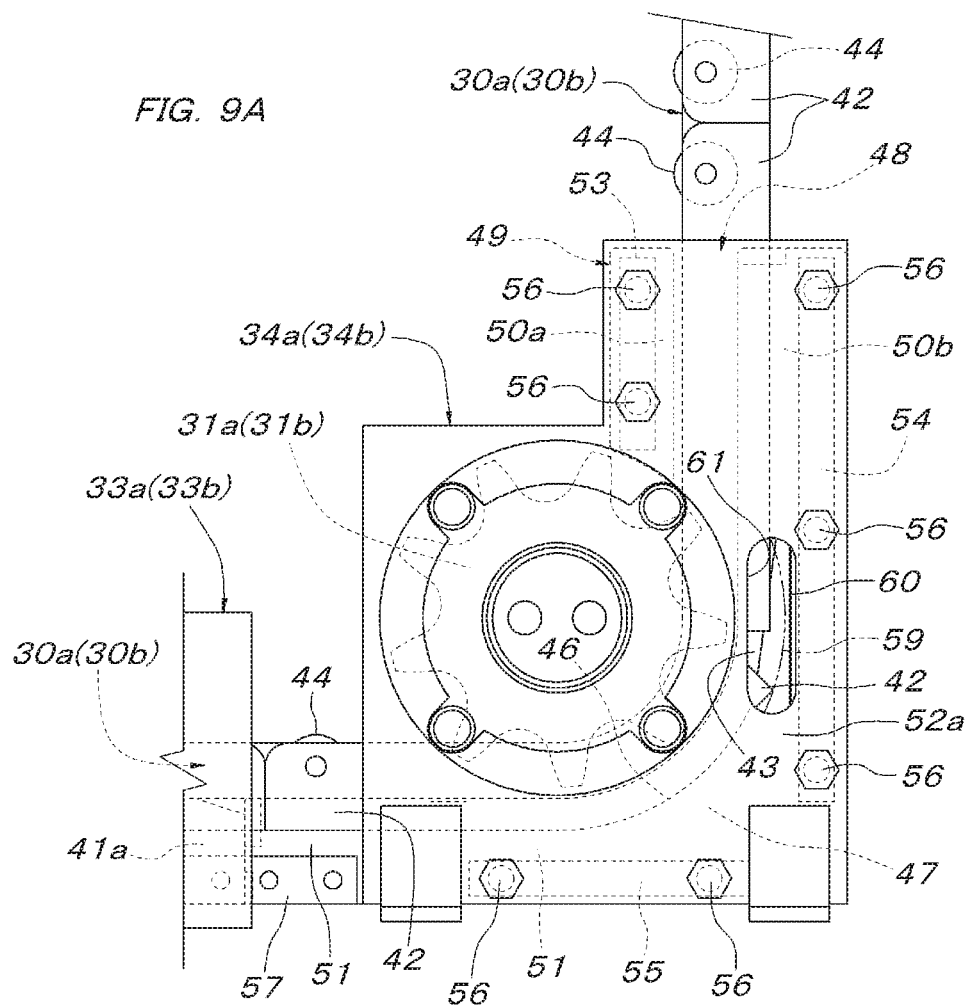
FIG. 9A is a side view showing a main part of an embodiment of the present invention.
Figure 9B:
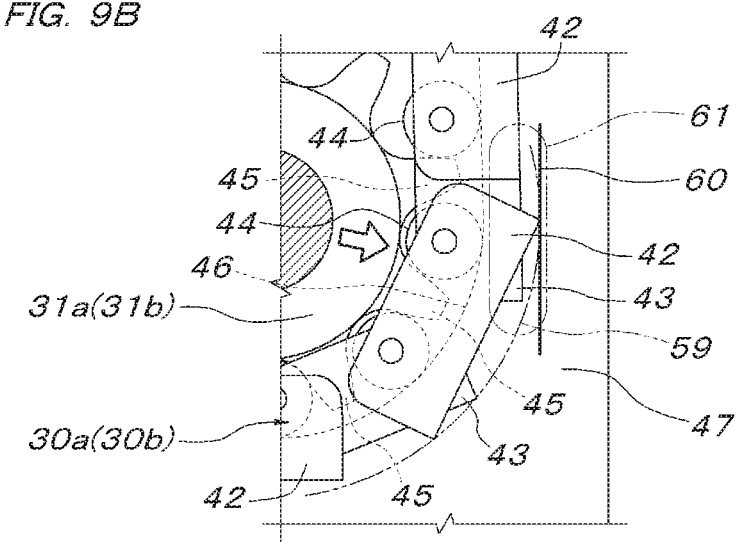
FIG. 9B is a main part enlarged side view showing a state where the wear of the main part is detected.

As shown in FIG. 6, the driving sprocket wheels 31a and 31b drive the drive chains 30a and 30b with teeth portions 45 which enter between the inner links 43 of the drive chains 30a and 30b and between the link-to-link rollers 44 adjacent in the length direction from the bendable sides of the drive chains 30a and 30b (the side of the inner side), and within the pair of left and right driving sprocket wheel storage casings 34a and 34b for incorporating and pivotally supporting the driving sprocket wheels 31a and 31b, as shown in FIGS. 6, 7 and 9A, a chain guide plate 47 having a guide surface 46 which enters, from the outside, between the inner links 43 in the drive chains 30a and 30b so as to sandwich the respective link-to-link rollers 44 with the driving sprocket wheels 31a and 31b and a drive chain holding means 49 which linearly holds the drive chains 30a and 30b in the vertically linear path section between an upper end opening portions 48 of the driving sprocket wheel storage casings 34a and 34b and the driving sprocket wheels 31a and 31b are provided. The drive chain holding means 49 is formed with a pair of chain guide plates 50a and 50b which sandwich the link-to-link rollers 44 of the drive chains 30a and 30b from both the inner side and the outer side, and the chain guide plate 50b of the pair of inner and outer chain guide plates 50a and 50b is formed with a part extending upward from the upper end of the chain guide plate 47. In addition, the chain guide plate 47 forms a horizontally supporting chain guide plate 51 which supports the horizontal path section of the drive chains 30a and 30b that is extended forward and horizontally from the forward-facing lower side thereof so as to enter the drive chain free end side storage casings 33a and 33b from below the driving sprocket wheels 31a and 31b.

The respective chain guide plates 47, 50a, 50b and 51 arranged within the driving sprocket wheel storage casings 34a and 34b are fixed to both left and right side walls 51a and 52b pivotally supporting the driving sprocket wheels 31a and 31b of the driving sprocket wheel storage casings 34a and 34b via plate-shaped spacers 53 to 55 interposed between both the side walls 51a and 52b so as to be positioned at the center between both the side walls 51a and 52b. Reference sign 56 denotes fixing bolts and nuts which horizontally penetrate the respective chain guide plates 47, 50a, 50b and 51, the plate-shaped spacers 53 to 55 on both sides thereof and both the left and right side walls 51a and 52b. FIG. 7 is shown in a state where a cover plate is removed which closes both front and rear sides and an upper side between both the left and right side walls 51a and 52b.

The horizontally supporting chain guide plate 51 on the side of the bottom portion within the driving sprocket wheel storage casings 34a and 34b is extended forward from the driving sprocket wheel storage casings 34a and 34b, the tip end thereof is made to butt against the rear end of a strip plate portion 41a forming the lower side of the lower horizontal slit portion 40a of the vertical guide plates 41 within the drive chain free end side storage casings 33a and 33b, and the rear end portion of the strip plate portion 41a and the tip end portion of the horizontally supporting chain guide plate 51 are integrally coupled by coupling plates 57 and bolts and nuts 57a sandwiching both of them.

Figure 4A:
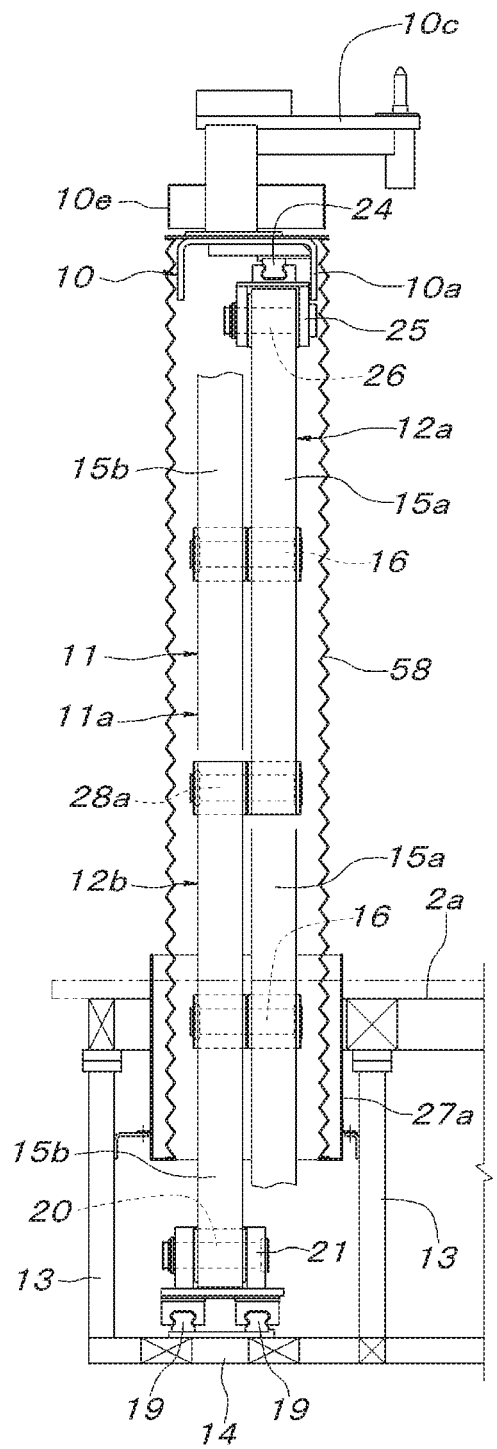
FIG. 4A is a rear view showing the lower end movable support shaft side of one parallel link mechanism in the state where the workpiece support base is raised to the raising limit height.
Figure 4B:
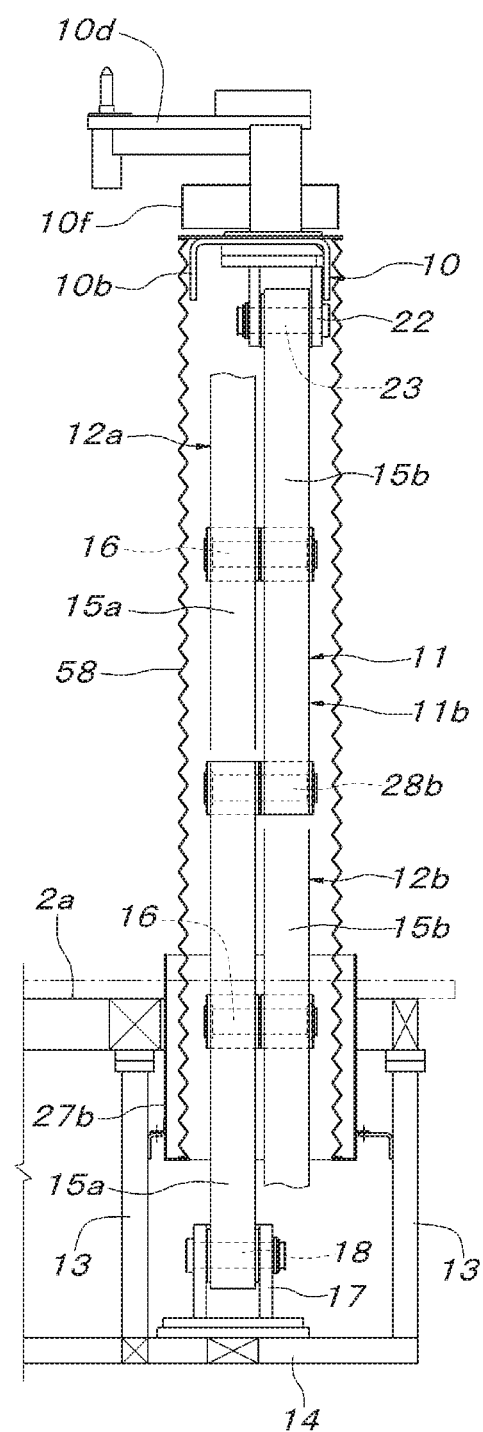
FIG. 4B is a rear view showing the lower position fixed support shaft side of the other parallel link mechanism in the state where the workpiece support base is raised to the raising limit height.

In this embodiment, as shown in FIGS. 1, 2 and 4, between the periphery of the pair of left and right supporting main bodies 10a and 10b forming the workpiece support base 10 and the inner circumferential portions of the bottom portions of the rectangular cylindrical bodies 27a and 27b on the side of the conveying traveling body 2, a rectangular cylindrical bellows cover 58 is interposed which covers the parallel link units 11a and 11b performing a rising/falling movement and the vertically linear portions 36 of the drive chains 30a and 30b and which is freely expanded and contracted in the up/down direction.

In the workpiece support device 1 configured as described above, the speed reducer equipped motor 32 of the raising/lowering drive means 29 is operated such that the pair of left and right driving sprocket wheels 31a and 31b are driven to rotate forward at the same speed, and by pushing the respective drive chains 30a and 30b upward from the driving sprocket wheels 31a and 31b, the vertically linear portions 36 of the respective drive chains 30a and 30b are extended in the upward direction to move upward the pair of left and right supporting main bodies 10a and 10b in the workpiece support base 10 supported. The supporting main bodies 10a and 10b are supported with the pair of left and right parallel link units 11a and 11b of the parallel link mechanism 11 such that the supporting main bodies 10a and 10b can only be linearly and vertically moved while keeping a horizontal posture, with the result that the workpiece support base 10 is moved upward to a raising limit height shown in FIG. 1 while keeping the horizontal posture. At this time, together with the lateral movement of the movable bearings 20 and 25 of the parallel link units 11a and 11b in the forward direction, both the upper and lower horizontal support shafts 21 and 26 horizontally move close to the horizontal support shafts 18 and 23 of both the upper and lower fixed bearings 17 and 22.

By the speed reducer equipped motor 32 of the raising/lowering drive means 29, the pair of left and right driving sprocket wheels 31a and 31b are driven to rotate in reverse at the same speed, and reducing the vertically linear portions 36 of the respective drive chains 30a and 30b downward by the driving sprocket wheels 31a and 31b, it is possible to linearly move the pair of left and right supporting main bodies 10a and 10b in the workpiece support base 10 supported downward to the lowering limit height shown in FIG. 2 while keeping the horizontal posture. At this time, together with the lateral movement of the movable bearings 20 and 25 of the parallel link units 11a and 11b in the backward direction, both the upper and lower horizontal support shafts 21 and 26 horizontally move away from the horizontal support shafts 18 and 23 of both the upper and lower fixed bearings 17 and 22. When the workpiece support base 10 reaches the lowering limit height, the pair of left and right supporting main bodies 10a and 10b enter the rectangular cylindrical bodies 27a and 27b provided in the main body 2a of the conveying traveling body 2, and thus the respective parallel link units 11a and 11b are brought into a folded state within a region ranging from the supporting main bodies 10a and 10b entering the rectangular cylindrical bodies 27a and 27b to the lower horizontal frame 14.

When the workpiece support base 10 is moved parallelly and vertically by the above-described raising/lowering drive means 29, the lower end portions of the vertically linear portions 36 supporting the workpiece support base 10 of the pair of left and right drive chains 30a and 30b are held linearly in the up/down direction by the pair of inner and outer chain guide plates 50a and 50b in the drive chain holding means 49 within the driving sprocket wheel storage casings 34a and 34b with at least three link-to-link rollers 44 adjacent in the up/down direction sandwiched between the inner and outer chain guide plates 50a and 50b, and the lower end portions of the vertically linear portions 36 is also positioned leftward and rightward in a lateral direction by the outer chain guide plate 50b fitted between the inner links 43, with the result that the vertically linear portions 36 which support the workpiece support base 10 reliably support the workpiece support base 10 in a vertical posture without being inclined in the forward/backward direction. In a range of approximately 90 degrees around the driving sprocket wheels 31a and 31b below the drive chain holding means 49, the link-to-link rollers 44 of the respective drive chains 30a and 30b are sandwiched between the inner surfaces of the teeth portions 45 in the driving sprocket wheels 31a and 31b and the arc-shaped guide surface 46 of the chain guide plate 47 on the outer side, and the inner circumferential portion of the chain guide plate 47 enters between the inner links 43 such that the link-to-link rollers 44 are also positioned leftward and rightward in the lateral direction, with the result that the link-to-link rollers 44 are turned along the fixed arc-shaped path around the driving sprocket wheels 31a and 31b.

Furthermore, in regions which are extended forward from the lower positions of the driving sprocket wheels 31a and 31b in the respective drive chains 30a and 30b to the free ends, the link-to-link rollers 44 of the drive chains 30a and 30b are moved while being supported and guided by the horizontally supporting chain guide plates 51 which are extended forward from the lower side of the driving sprocket wheels 31a and 31b, the lower sides of the lower horizontal slit portions 40a and the lower sides of the upper horizontal slit portions 40c of the U-shaped guide slits 40 in the vertical guide plates 41 within the drive chain free end side storage casings 33a and 33b. As a matter of course, the horizontally supporting chain guide plates 51 and, parts of both the outer and inner sides of the U-shaped guide slits 40 in the vertical guide plates 41 forming the outer side regulate the positions of, leftward and rightward in the lateral direction, the drive chains 30a and 30b which are fitted between the inner links 43 of the drive chains 30a and 30b so as to be moved.

In the vertically movable workpiece support device 1 configured and used as described above, in a state where the arc-shaped guide surface 46 of the chain guide plate 47 is accurately formed, to the drive chains 30a and 30b which are guided by the arc-shaped guide surface 46 of the chain guide plate 47 so as to be moved in the shape of an arc, the drive chains 30a and 30b which are positioned on the upper side thereof and which are guided by the drive chain holding means 49 so as to be moved linearly in the up/down direction are in a state of being connected in a tangential direction. In this state, an outer circumferential locus 59 (see FIG. 6) of the turning path of both the inner and outer links 42 and 43 in the drive chains 30a and 30b which engage with the teeth portions 45 of the driving sprocket wheels 31a and 31b so as to be turned is an arc line which has a certain radius and which is expanded outward concentrically with the driving sprocket wheels 31a and 31b. Therefore, in a position separated only a certain distance (for example, about 2 mm) outward from the position of the outer circumferential locus 59 of the turning path of both the inner and outer links 42 and 43 at the height of the axis center of the driving sprocket wheels 31a and 31b, a marker straight line 60 in the up/down direction is displayed on the side surface of the chain guide plate 47. Although the marker straight line 60 may be directly drawn on the side surface of the chain guide plate 47, a separate plate on which the marker straight line 60 is drawn may be attached and fixed to the side surface of the chain guide plate 47.

Of both the left and right side surfaces of the chain guide plate 47, the marker straight line 60 is displayed not on the side (the inner side) on which the speed reducer equipped motor 32 is present but on the side surface on the opposite side (outer side). Of both left and right side walls 52a and 52b to which the driving sprocket wheels 31a and 31b of the driving sprocket wheel storage casings 34a and 34b incorporating the chain guide plate 47 are pivotally supported, that is, of the inner side wall 52b on which the speed reducer equipped motor 32 is present and the side wall 52a on the opposite side (outer side), on the outer side wall 52a adjacent to the side wall of the chain guide plate 47 on which the marker straight line 60 is displayed, a long-hole-shaped opening portion 61 which is long in the up/down direction is provided that is used for visually checking the marker straight line 60 and the outer circumferential locus 59 of the turning path of both the inner and outer links 42 and 43 in the drive chains 30a and 30b which are turned inward of the marker straight line 60.

According to the configuration described above, when the arc-shaped guide surface 46 of the chain guide plate 47 is in a normal state where the guide surface 46 does not wear, by visually observing the outer circumferential locus 59 of the turning path of both the inner and outer links 42 and 43 in the drive chains 30a and 30b which are turned along the arc-shaped guide surface 46 through the long-hole-shaped opening portion 61, it is possible to confirm that the outer circumferential locus 59 passes through the position separated by the certain distance (for example, about 2 mm) inward from the marker straight line 60. On the other hand, the arc-shaped guide surface 46 of the chain guide plate 47 gradually wears by sliding contact of the link-to-link rollers 44 of the drive chains 30a and 30b, and by the wear of the guide surface 46, the outer circumferential locus 59 of the turning path of both the inner and outer links 42 and 43 in the drive chains 30a and 30b is displaced outward away from the driving sprocket wheels 31a and 31b and approach the marker straight line 60.

Therefore, if the display position of the marker straight line 60 is set in advance such that, when the wear of the arc-shaped guide surface 46 of the chain guide plate 47 reaches an allowable limit, the outer circumferential locus 59 makes contact with the marker straight line 60, a procedure of conducting a visual observation through the long-hole-shaped opening portion 61 is performed every appropriate time (days) such that a gap between the outer circumferential locus 59 of the turning path of both the inner and outer links 42 and 43 in the drive chains 30a and 30b and the marker straight line 60 is checked, with the result that it is possible to confirm, by the fact that the outer circumferential locus 59 makes contact with the marker straight line 60, that the wear of the arc-shaped guide surface 46 of the chain guide plate 47 reaches the allowable limit. By this confirmation, it is possible to take necessary measures, such as the replacement of the chain guide plate 47 with a new one, without delay.

The vertically movable workpiece support device of the present invention can be utilized as a device which makes it possible to simply and accurately know the time for replacement of a chain guide plate, that guides a drive chain for driving a workpiece support base to raise and lower the workpiece support base around a driving sprocket wheel, due to wear.

What is claimed is:

1. A vertically movable workpiece support device comprising:
   a parallel link mechanism that supports a workpiece support base so as to be parallelly and vertically movable;
   a raising/lowering drive means that drives the workpiece support base to raise and lower the workpiece support base and the raising/lowering drive means is formed with a drive chain that is bendable to only one side and a driving sprocket wheel that engages with the drive chain and in which the drive chain supports the workpiece support base in a vertically linear path section between the workpiece support base and the driving sprocket wheel;
   the drive chain having a plurality of pairs of left and right links and a plurality of link-to-link rollers pivotally supported between the pairs of links;
   a chain guide plate which contacts a link-to-link roller of the drive chain between a pair of links supporting said link-to-link roller, as said link-to-link roller is turned around the driving sprocket wheel and which sandwiches said link-to-link roller with the driving sprocket wheel;
   a mark is displayed on the chain guide plate, in a position separated at a predetermined distance outward from a turning path of the links in the drive chain; and
   a side wall is positioned lateral to the chain guide plate and the side wall pivotally supports the driving sprocket wheel, and an opening is disposed in the side wall for viewing the mark to visually check a distance between the mark and the turning path of the links.

2. The vertically movable workpiece support device according to claim 1, wherein:
   the chain guide plate extends higher than a height of an axis center of the driving sprocket wheel to form an outer chain guide plate of a drive chain holding means formed with a pair of inner and outer chain guide plates which sandwich, from both inner and outer sides, the vertically linear path section of the drive chain, and the mark and the opening portion are provided at the same height as the axis center of the driving sprocket wheel.

3. The vertically movable workpiece support device according to claim 2, wherein the mark is formed with a straight line in an up/down direction, and the opening portion of the side wall is formed with a long hole which is long in the up/down direction.

* * * * *